(No Model.)
W. GALLOWAY.
EARTHENWARE VESSEL.
No. 248,643. Patented Oct. 25, 1881.
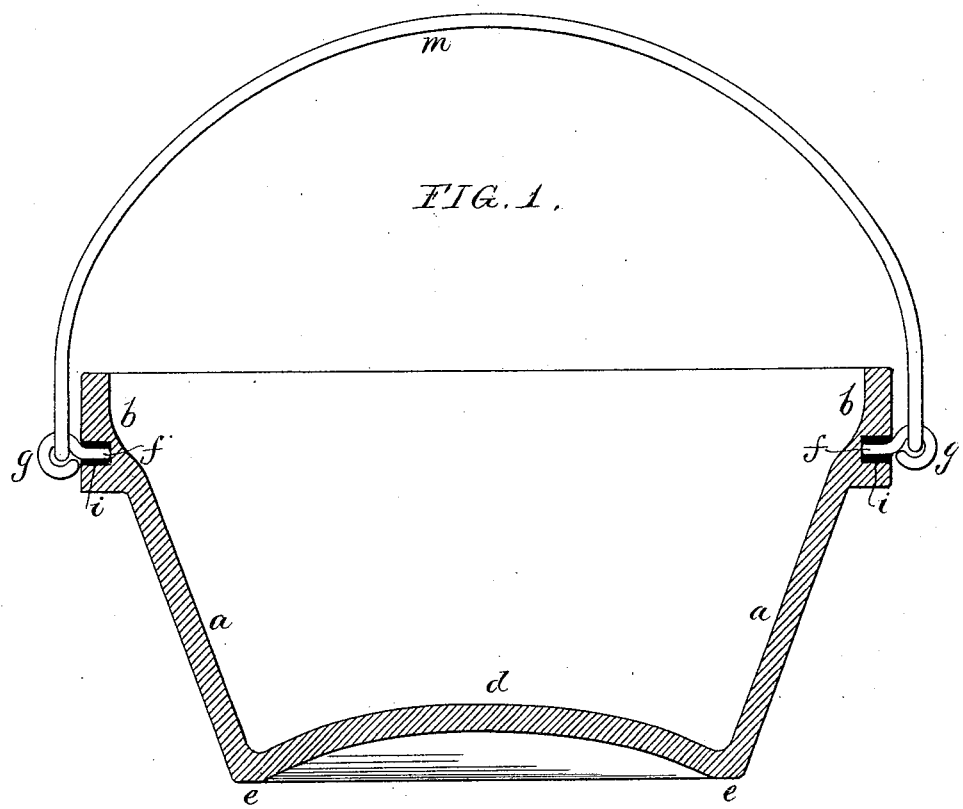
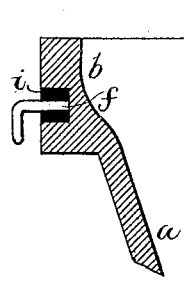 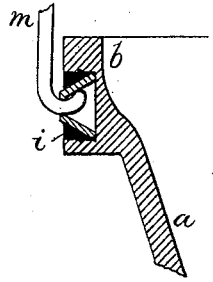 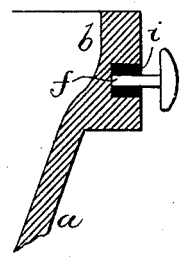
Witnesses:
James F. Tobin.
Harry Smith
Inventor:
William Galloway
by his Attorneys
Howson and Son

United States Patent Office.

WILLIAM GALLOWAY, OF PHILADELPHIA, PENNSYLVANIA.

EARTHENWARE VESSEL.

SPECIFICATION forming part of Letters Patent No. 248,643, dated October 25, 1881.

Application filed March 7, 1881. (No model.)

*To all whom it may concern:*

Be it known that I, WILLIAM GALLOWAY, a citizen of the United States, residing in Philadelphia, Pennsylvania, have invented certain Improvements in Earthenware Vessels, of which the following is a specification.

The object of my invention is to provide a cheap and effective means of securing bails to earthenware vessels; and this object I attain in the manner which I will now proceed to describe, reference being had to the accompanying drawings, in which—

Figure 1 is a transverse section of an earthenware culinary vessel constructed and having a bail-fastening in accordance with my invention, and Figs. 2, 3, and 4 views showing modified forms of said bail-fastening.

The vessel shown in Fig. 1 has a flaring body, $a$, an annular rim, $b$, and an arched bottom, $d$, with a contracted annular bearing-surface, $e$, in line with the body $a$ of the vessel, so that on applying said vessel to a heated stove or range plate the heat will be distributed uniformly and gradually through both the bottom and body, thus overcoming the risk of fracture caused by the unequal expansion of the bottom and body when the entire bottom is directly in contact with or in close proximity to a highly-heated stove-plate.

During the molding of the vessel recesses are formed at opposite points in the rim $b$ of the same, and after the baking of the vessel the shanks $f$ of metallic eyes $g$ are inserted into these recesses and secured therein by means of lead or other suitable cement, $i$, poured into said recesses and surrounding the shanks $f$. The eyes $g$ are adapted for the reception of the hooked ends of the bail $m$ of the vessel, and serve as a secure and convenient means of attaching said bail to the vessel. Eyes, however, are not essential for this purpose, as a hooked pin, such as shown in Fig. 2, or a pin having a head, as shown in Fig. 3, may be used, or in some cases a socket may be employed, as in Fig. 4, the end of the bail being simply bent for introduction into this socket.

The shank of the eye $g$ or the stems of the pins may be roughened, if desired, to insure a proper hold of the cement thereon.

I am aware that various plans have been devised of securing bail-fastenings to earthenware vessels; but none of these devices, so far as I am aware, are as economical and effective as the plan which I adopt.

I claim as my invention—

The combination of an earthenware vessel having opposite recesses, with bail-fastening devices portions of which are adapted to said recesses and are secured therein by cement, as set forth.

In testimony whereof I have signed my name to this specification in the presence of two subscribing witnesses.

WM. GALLOWAY.

Witnesses:
JAMES F. TOBIN,
HARRY SMITH.